United States Patent [19]
Blank et al.

[11] Patent Number: 5,470,195
[45] Date of Patent: Nov. 28, 1995

[54] VACUUM TURRET

[75] Inventors: David L. Blank, Cedarburg; Roger O. Crill, Port Washington; Bruce A. Pusey, Milwaukee; Kashyap H. Shah, Brookfield, all of Wis.

[73] Assignee: Globe-Union, Inc., Milwaukee, Wis.

[21] Appl. No.: 180,847

[22] Filed: Jan. 12, 1994

[51] Int. Cl.$^6$ ............................................ B65G 59/04
[52] U.S. Cl. .................. 414/797; 414/744.2; 414/744.3
[58] Field of Search .............................. 414/737, 744.2, 414/797; 271/103

[56] References Cited

U.S. PATENT DOCUMENTS

| | | | |
|---|---|---|---|
| 3,724,687 | 4/1973 | Marschke et al. | 414/797 |
| 4,614,018 | 9/1986 | Krall | 414/744.2 X |
| 4,676,710 | 6/1987 | Shiraishi | 414/908 X |
| 4,680,000 | 7/1987 | Nowicki et al. | 271/103 X |
| 4,822,234 | 4/1989 | Johnson et al. | 271/103 X |

Primary Examiner—Michael S. Huppert
Assistant Examiner—Janice L. Krizek
Attorney, Agent, or Firm—Foley & Lardner

[57] ABSTRACT

A vacuum turret apparatus for moving objects from a first location to a second location is disclosed. The turret is specifically designed to move individual plate-like objects from a stack of such objects located at the first location to the second location. Flexible bellows in combination with vacuum are used to lift, hold, and move the objects. An air knife ejecting a stream of high pressure air towards the selected object helps separate that object from the rest of the stack.

21 Claims, 6 Drawing Sheets

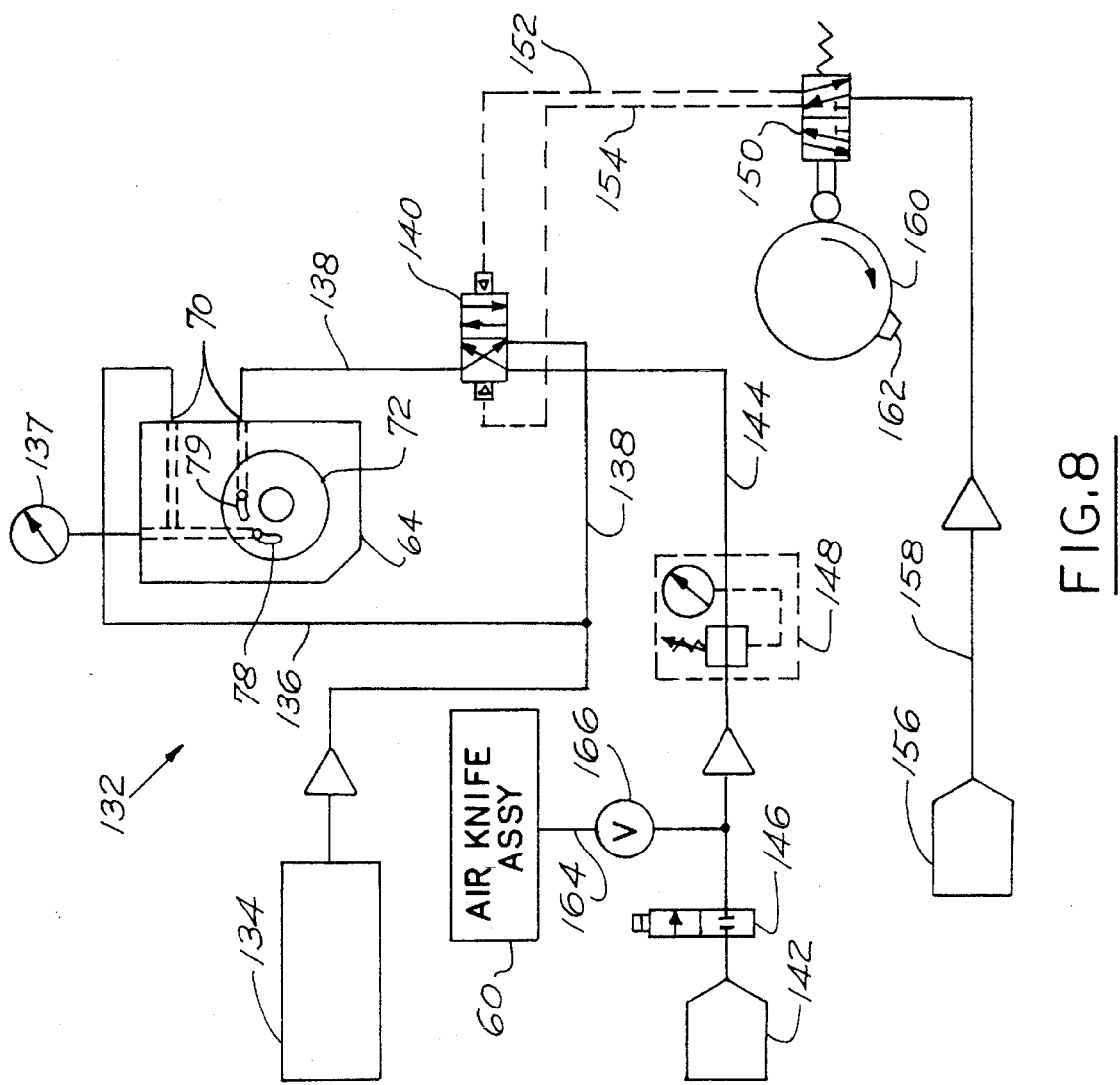
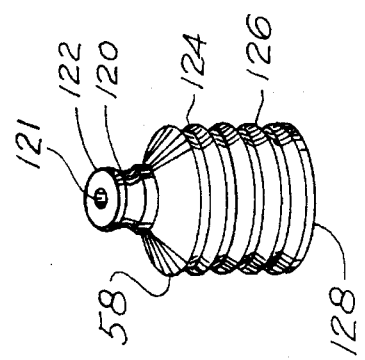
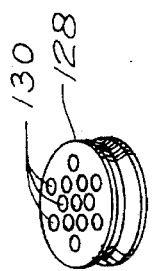

VACUUM TURRET

TECHNICAL FIELD

This invention relates generally to a turret apparatus for moving objects from a first location to a second location. More particularly, this invention relates to a vacuum turret apparatus which moves individual plates, such as storage battery electrode plates, from a stack of such plates located at the first location to the second location for further processing and assembly.

BACKGROUND OF THE INVENTION

In various industries, turret assemblies are used for moving and manipulating objects. For example, workpieces are mounted on a section or an arm of a turret and moved from one workstation to the next, with each workstation being designed to manipulate the workpiece in a specific way. Other turrets are used to simply transfer an object from one location to another, such as movement from one conveyor to another. The workpieces or objects are attached and detached from such turrets in a wide variety of ways, including the use of vacuum during rotation of the turret.

In the storage battery industry, lead-acid batteries and other types of storage batteries are made with numerous positive and negative electrode plates. During the assembly of such batteries, the electrode plates and handled by a variety of machines. In a typical manufacturing process, the electrode plates are initially placed in stacks designated either as positive or negative. The negative and positive stacks are separated into individual plates which are later reassembled in an alternating or staggered formation within the battery casing. Initially, the plates of the negative stacks are handled on separate equipment from the plates of the positive stacks.

The equipment may include a conveyor that moves each stack to a location where the individual plates are broken loose from one another. This step is necessary since some electrode plates, such as lead battery plates, tend to adhere to one another. After the electrode plates are broken loose, they are moved to a second conveyor which directs them to another workstation for eventual combination with the electrode plates of opposite polarity.

Problems can arise in moving individual electrode plates from the stack of plates to the second conveyor. Such problems include selecting and manipulating individual plates from the stack of plates, and depositing them safely at a second location. Lead electrode plates are particularly troublesome since they tend to be relatively heavy, porous, and fragile. Consequently, special provisions must be made for separating and moving an individual plate from a stack and presenting it to a conveyor at a second location.

A reel-type assembly having two reel ends connected by rods has been used to transfer such plates. Rotatable suction cup assemblies are mounted on the rods and their respective rotations are appropriately timed to bring the suction cups into contact with the outermost plate in a stack of plates. The suction cups contact the plate, pick it up, rotate it over the top of the reel, and position it at a second location, e.g. on a conveyor. With this complex arrangement, it is difficult to achieve the desired dependability and operating speeds required in modern battery assembly plants.

Traditional turret systems have also proved to be problematic for moving objects such as battery electrode plates. The individual plates are difficult to pick up and move to a second location without risk of breakage or poor orientation at the second location. Even with existing vacuum turrets, sufficiently fast, consistent movement of such objects cannot be achieved. If the vacuum is too low, the heavy lead plates are not picked up quickly enough, if at all. However, if the vacuum is increased, there is added risk of breakage or of lifting more than one plate at a time. The porosity of such electrode plates allows the vacuum to sometimes pick up a second plate.

Existing systems also present other problems since they do not adequately hold the plates in a stable fashion during the rapid movement from a first location to a second location. The heavy planar electrode plate can sway or twist, leading to additional breakage or misalignment of the plate when it is deposited at the second location.

The present invention addresses the problems described above and provides an apparatus for consistent, rapid movement of individual objects from a first location to a second location.

SUMMARY OF THE INVENTION

The present invention provides an apparatus for transferring objects, such as storage battery electrode plates, from a first location to a second location. The objects are generally in a stacked configuration and the apparatus selects individual objects from the stack and moves them from the first location to the second location, where it then deposits each object.

The apparatus includes a framework on which a turret assembly is rotatably mounted about a central turret axis. The turret assembly includes at least one arm having a suction head disposed at a spaced distance from the central axis. An indexing assembly is connected to the turret assembly to rotate it in a stepwise fashion. Thus, each suction head is moved sequentially from the first location to the second location.

A pneumatic circuit is configured for connection between a vacuum source and each suction head to selectively provide a vacuum at a particular suction head when it is in proximity to the first location. The vacuum is sufficient to secure an individual object to the suction head and the suction head is configured to stabilize the object as it moves from the first location to the second location. Preferably, this stable orientation is maintained by at least one retractable bellow attached to each suction head. The bellow allows the individual object to be pulled into proximity with the suction head and securely holds it during a preselected portion of the turret assembly rotation.

BRIEF DESCRIPTION OF THE DRAWINGS

The invention will hereafter be described with reference to the accompanying drawings, wherein like numerals denote like elements, and:

FIG. 6 is a perspective view of one of the bellows;

FIG. 7 is a perspective view of the filter screen which is connected inside the bellows;

FIG. 8 is a schematic representation of the pneumatic circuit which provides vacuum and pressure to the turret apparatus;

DETAILED DESCRIPTION OF THE PREFERRED EMBODIMENT

Figure 1:
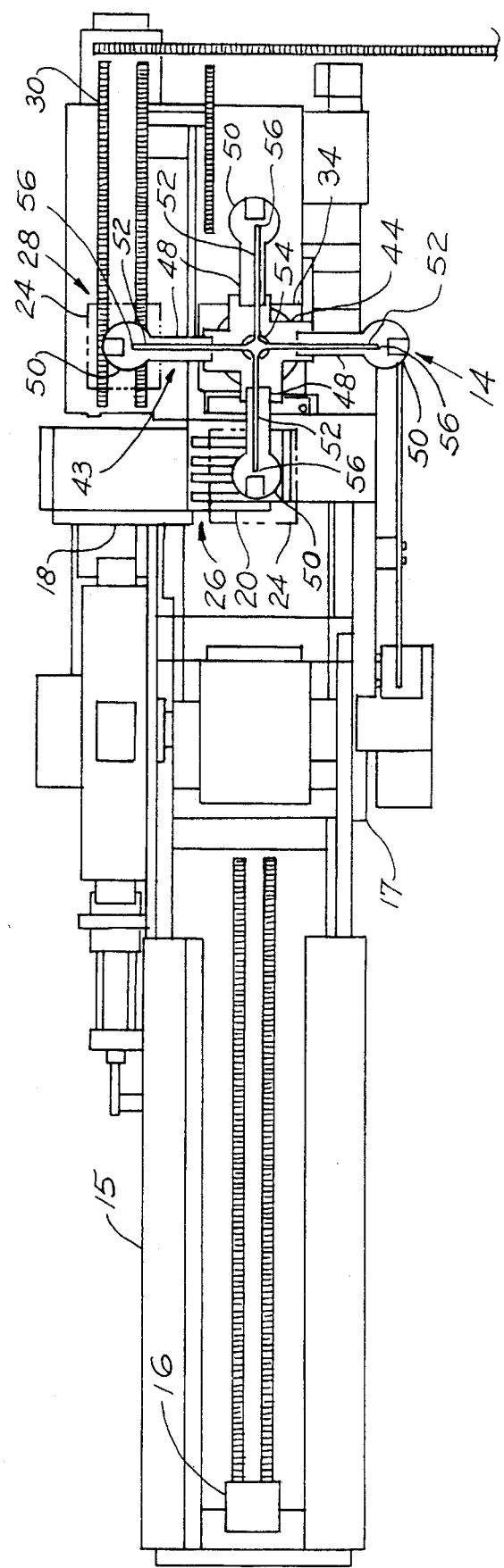
FIG. 1 is a schematic top view of a vacuum turret apparatus according to the preferred embodiment of the invention, as well as a schematic representation of the processing equipment leading to and away from the turret apparatus.
Figure 2:
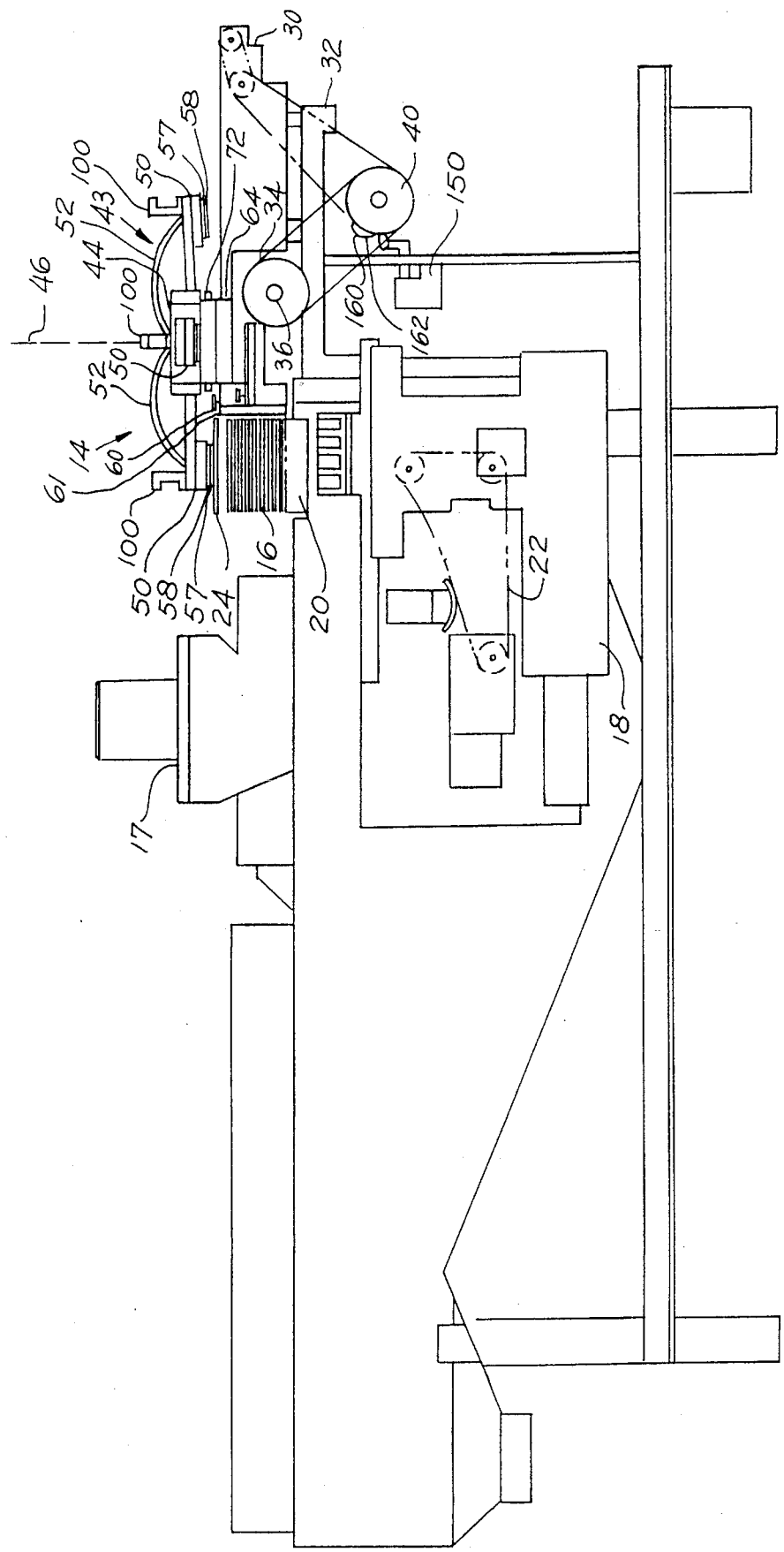
FIG. 2 is a front view of the turret apparatus, also showing a schematic representation of the processing equipment leading to and away from the turret apparatus.

Referring generally to FIGS. 1 and 2, a turret apparatus 14 according to a preferred embodiment of the present invention is shown in a typical environment in which it is used. Although apparatus 14 could be used for a variety of different purposes, the invention will be described with reference to the moving and assembly of lead electrode plates of the type which are assembled into lead-acid storage batteries. The reader should note that the present system works particularly well with the porous lead electrode plates used in battery construction, but it could be used in numerous other applications and the invention is not limited to that specific environment.

To understand how battery electrode plates are processed and moved by apparatus 14, reference is made to FIG. 1, which shows a first conveyor 15 on which a stack 16 of battery electrode plates has been placed. Stack 16 includes either negative electrode plates or positive electrode plates, and preferably the plates of opposite polarity are handled on a similar parallel system with a second apparatus (not shown). The parallel systems separate the stacks of plates into individual plates that are later assembled in alternating positive and negative orientation in a battery casing. However, to facilitate this description, only one apparatus 14 and one overall system will be described.

Stack 16 may be placed on first conveyor 15 by hand. First conveyor 15 moves stack 16 along until it comes to a plate breaker station 17. At station 17, the stack of plates 16 is tipped on end and the individual plates are broken loose from one another by a jarring motion such as that achieved by pounding the edge of the stack with a hydraulic or pneumatic plunger. After the plates are jarred loose from one another, stack 16 is moved to an elevator station 18 which takes stack 16, moves it under turret apparatus 14, and raises it until it is in proximity with turret apparatus 14. As individual plates are removed from stack 16, an elevator platform 20 continually raises stack 16 to maintain the uppermost plate of stack 16 in proximity with turret apparatus 14. The constant elevation of stack 16 can be controlled in a variety of ways, including the use of proximity detectors. The detector is connected through appropriate circuitry to a control motor attached to elevator platform 20 by a drive mechanism, such as a drive chain 22 illustrated schematically in FIG. 2.

When stack 16 is moved into proximity with turret apparatus 14, an individual object or plate 24 arrives at a first location 26 and is selected or picked up by turret apparatus 14. Electrode plate 24 is then rotated to a second location 28, where it is deposited on a second conveyor 30. Second conveyor 30 moves the individual electrode plate 24 away from turret apparatus 14 for further processing and assembly.

In the preferred embodiment, turret apparatus 14 includes a framework 32 to which an indexing assembly 34, such as the Model No. 8D-04339R-S2A1/X manufactured by Sankyo America Inc., is attached. Depending on the particular application of turret apparatus 14, the cam profiles within indexing assembly 34 are sometimes customized to improve the indexing motion. Indexing assembly 34 is driven by a drive shaft 36 which, in turn, is driven by a drive pulley or drive sprocket 40. Drive sprocket 40 is connected to a system power source (not shown).

Turret apparatus 14 also includes a turret assembly 43 having a center hub 44 mounted on indexing assembly 34 for rotation about a central turret axis 46. Turret assembly 43 has at least one arm 48, and preferably four arms 48, connected to center hub 44. A suction head 50 is attached to each arm 48 at a spaced distance from central turret axis 46. Preferably, each arm 48 is pivotably mounted to hub 44 to allow generally vertical movement of the corresponding suction head 50. Each suction head 50 is also connected by a pneumatic line 52 extending between a connector 54 on hub 44 and a port 56 in each suction head 50.

Figure 3:
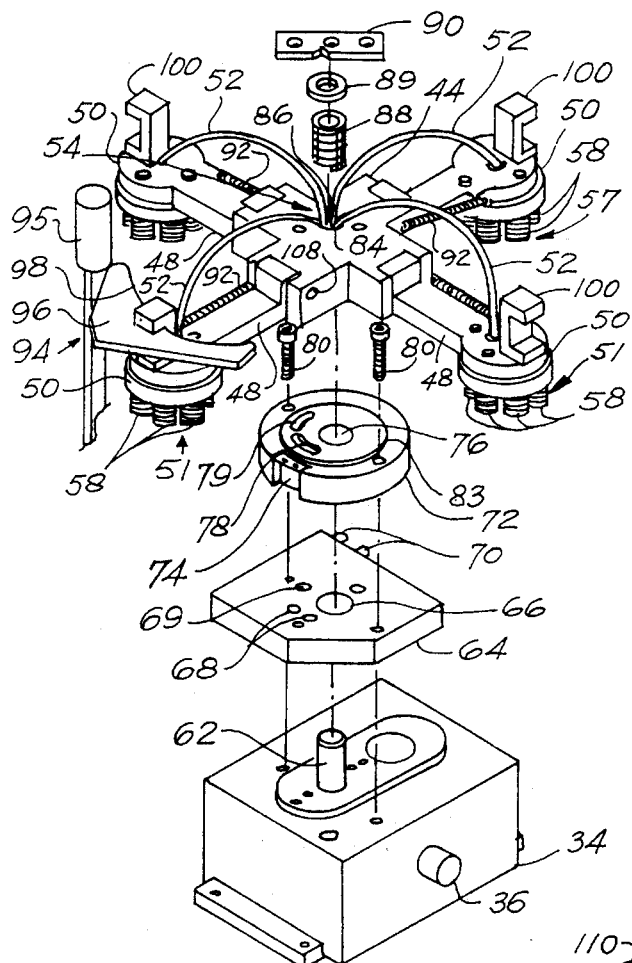
FIG. 3 is a partially exploded view of the turret apparatus.

As shown in FIG. 3, each suction head 50 includes an object stabilizer 57 preferably including at least one contractible bellows 58, and in the most preferred embodiment, including four bellows. In each suction head 50, the bellows 58 are in communication with the corresponding pneumatic line 52 to selectively attach and detach each electrode plate 24. Thus, as one of the suction heads 50 moves into proximity with first location 26, appropriate pneumatic circuitry (discussed below) supplies a vacuum through pneumatic line 52 and corresponding bellows 58. The vacuum is sufficient to lift individual plate 24 from stack 16. The vacuum is maintained as indexing assembly 34 rotates center hub 44 and the individual plate 24 to second location 28. In proximity to location 28, the vacuum is decreased and preferably pressure is supplied through pneumatic line 52 and corresponding bellows 58 to force plate 24 away from the suction head 50. In this example, the plate 24 would be deposited on second conveyor 30.

Turret assembly 14 also includes an air knife assembly 60 appropriately disposed to direct a jet of pressurized air towards the uppermost individual electrode plate 24 on stack 16. Air knife assembly 60 preferably includes a narrow aperture 61 having a thickness approximately 0.001 to 0.005 inches and most preferably about 0.002 inches and having a length approximately equal to the length of plate 24, although these parameters can be changed according to the specific application. By appropriately locating air knife 60 to direct this thin, high pressure sheet of air towards uppermost individual plate 24, the process of separating this plate from the remaining stack 16 is facilitated.

FIG. 3 illustrates an exploded view of a portion of turret apparatus 14. Indexing assembly 34 is shown to include an output shaft 62 fixedly connected to center hub 44 to index or otherwise move each successive arm 48 and suction head 50 from first location 26 to second location 28, preferably in a stepwise fashion.

A manifold 64 is mounted over output shaft 62 and is fixed in a stationary position. An opening 66 extends through manifold 64 and is appropriately sized to receive output shaft 62 without restricting the rotation of shaft 62. Appropriate conduits 68 and 69 extend through manifold 64 and may be connected to pressure and/or vacuum supplies through connectors 70. One connector 70 allows vacuum or pressure to be supplied through conduit 69, while the other connector 70 allows vacuum to be supplied through conduit 68.

A cam plate 72 having a cam profile or cam surface 74 is mounted over manifold 64. Cam plate 72 includes a central opening 76 through which output shaft 62 passes. Cam plate 72 also includes a pair of elongate openings 78 and 79 disposed for cooperation with conduits 68 and 69, respectively. Preferably, a sealing engagement is formed between conduit 68 and the elongate opening 78 and also between conduit 69 and the other elongate opening 79. Cam plate 72 and manifold 64 are rigidly affixed against indexing assembly 34 by a pair of connectors 80 such as bolts.

Figure 5:
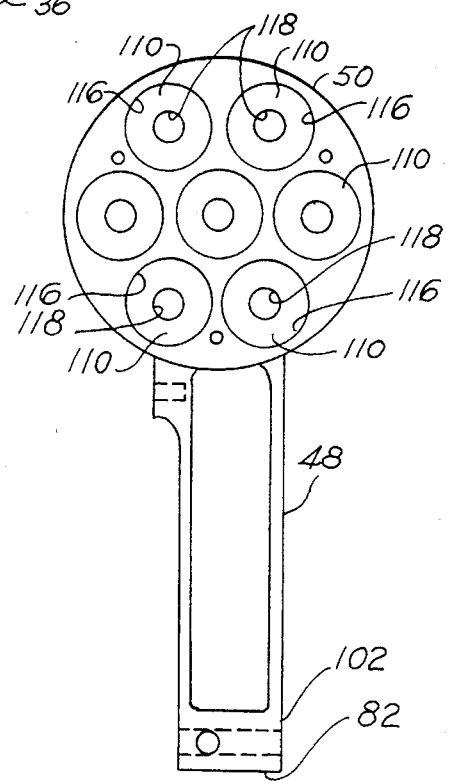
FIG. 5 is a bottom view of the arm and suction head for use with the turret apparatus.

Cam profile 74 is configured for sliding engagement with a cam follower surface 82 disposed on each arm 48 (see FIG. 5). Cam profile 74 extends around central turret axis 46 and drops radially inward in proximity to first location 26. This allows each arm 48 and corresponding suction head 50 to drop downwardly into closer proximity with the uppermost individual plate 24 of stack 16. After each arm 48 and corresponding suction head 50 move past first location 26, the cam profile 74 extends radially outward, forcing the suction head 50 in an upward direction to provide additional clearance. Preferably, cam profile 74 extends gradually radially outward over approximately 270°, although this radial displacement could be over a shorter or longer distance.

Cam plate 72 also has a central raised portion 83 which is generally circular and surrounds center opening 76. Elongate openings 78 and 79 extend through cam plate 72 within the outer periphery of central raised portion 83. Additionally, raised portion 83 is configured for mating engagement with the underside of hub 44 to provide a substantial seal between elongate openings 78, 79 and individual passages 84 which extend through hub 44 to communicate with each pneumatic line 52. Each hub passage 84 will form a substantial seal with each elongate opening 78, 79 as that hub passage 84 is rotated into alignment with one of the elongate openings 78, 79. Thus, vacuum or pressure can selectively be placed at individual suction heads, e.g., suction when each suction head 50 is at first location 26 and pressure when each suction head 50 is at second location 28.

Center hub 44 also includes a center opening 86 for receiving output shaft 62. Hub 44 is affixed to output shaft 62 in the radial direction to ensure that hub 44 rotates with output shaft 62. Shaft 62 and hub 44 may be radially affixed in a variety of ways including making shaft 62 a keyed shaft and locking it to hub 44 with a key (not shown). Center hub 44 is held against cam plate 72 in the axial direction by a compression spring 88 and a fastener 89, such as a locking collar, which is covered by a plate 90.

Preferably, arms 48 and suction heads 50 are maintained in an axially downward position by a spring 92 connected between hub 44 and each suction head 50. Springs 92 ensure that cam surface 82 of each arm 48 is held against cam surface 74 to provide the appropriate generally vertical, pivoting movement of suction heads 50.

In the preferred embodiment, a skip plate mechanism 94 is disposed in proximity to first location 26 and includes a generally horizontal plate 96 having a curved inner edge 98. A plate follower 100 is disposed on each suction head 50 in a position so that it moves along inner edge 98 as its corresponding suction head 50 moves through the area in proximity to and including first location 26. Skip plate mechanism 94 can be moved in a generally vertical direction, preferably by a pneumatic cylinder 95, to contact one of the plate followers 100 and lift the follower and corresponding suction head 50 away from the stack of electrode plates 16, preventing attachment of one of the electrode plates. For various reasons, it is sometimes necessary or desirable to skip one or more electrode plates, and skip plate mechanism 94 permits this without requiring shutdown of the vacuum system.

Figure 4:
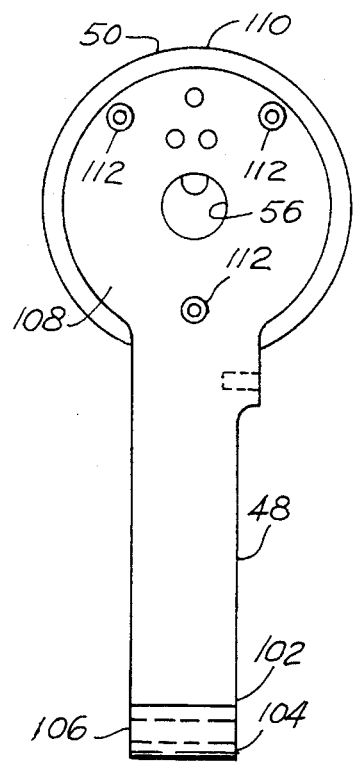
FIG. 4 is a top view of an arm and suction head for use with the turret apparatus.

In FIGS. 4 and 5, arm 48 and suction head 50 are shown in detail. Each arm 48 preferably includes a connection end 102 having a generally perpendicular offset member 104 through which a bore 106 extends. Bore 106 is configured to receive a pin 108 or other appropriate fastener which pivotally secures arm 48 to hub 44 as shown best in FIG. 3. Bore 106 is offset from cam surface 82 to facilitate pivoting movement of arm 48 in response to the interaction between cam surface 74 of cam plate 72 and cam surface 82 of arm 48.

Arm 48 is connected to suction head 50 and may be integrally formed with a portion of suction head 50. For instance, as shown in FIG. 4, a top portion 108 of suction head 50 is an integral extension from arm 48 and is attached to a bottom portion 110 of suction head 50. Top portion 108 and bottom portion 110 are connected together with a plurality of fasteners 112. Port 56 is disposed through top portion 108 and is configured for connection to one of the pneumatic lines 52.

As illustrated in FIG. 5, bottom portion 110 includes a plurality of cavities 116, each configured to receive a bellows 58. A central hole 118 must be formed through bottom portion 110 at the base of each cavity 116 if a bellows is to be inserted into the cavity. Holes 118 are formed to provide direct communication between port 56 and the bellows 58 in select cavities 116. This allows for vacuum or pressure at those respective bellows. At least one central hole 118 must be formed to allow for such vacuum or pressure through the suction head 50 and preferably four such holes are formed to receive four bellows. This provides stable, balanced support of plate 24 across the suction head 50.

Central holes 118 and cavities 116 are appropriately sized to receive bellows 58. Each bellows 58 includes a narrow neck portion 120 having a central bore 121 therethrough and an outer flange 122. The neck 120 is inserted into a corresponding central hole 118 and outer flange 122 retains the bellows 58 within cavity 116. (See FIG. 6)

From narrow neck portion 120, each bellows 58 expands into a contractible hollow body portion 124 which can contract or expand depending on whether sufficient vacuum exists within the hollow interior of body portion 124. Central bore 121 communicates with the hollow interior of body portion 124 to allow for vacuum or pressure within body portion 124.

Preferably, body portion 124 has an accordion-style wall 126 which can extend to lengthen or fold together to shorten body portion 124. The extension and contraction assists in lifting the upper plate 24 from stack 16. When bellows 58 of a given suction head 50 come into contact with an electrode plate 24 and sufficient vacuum is applied, body portion 124 will contract and lift the plate away from the rest of the stack. In the preferred embodiment, bellows 58 are made from a flexible material such as elastomeric materials including synthetic rubbers, natural rubbers, etc.

Each bellows 53 also preferably includes a screen 128 affixed within body portion 124. Screen 128 has a plurality of openings 130 to allow air to flow therethrough without permitting larger pieces of debris or other particles to be sucked inwardly. Additionally, screen 128 provides some support for plate 24 when the plate is attached by vacuum inside body portion 124. The screen helps prevent thin plates, such as the lead plates for use with storage batteries, from bowing or cracking inwardly under the vacuum force.

Referring generally to FIG. 8, a pneumatic circuit 132 for use in turret apparatus 14 is illustrated. Pneumatic circuit 132 interacts with manifold 64 and elongate openings 78 and 79 of cam plate 72 (shown in schematic form). Circuit 132 is configured to selectively provide vacuum at elongate opening 78 and vacuum or pressure at elongate opening 79. Preferably, suction is provided through opening 78 to each suction head 50 as it moves into proximity with first location 26. Similarly, suction is provided through openings 78 and 79 as the suction head 50 moves towards second location 28. However, in proximity to second location 28, pressure is provided through opening 79. The position and arrangement of openings 78 and 79 can be changed or openings can be added to provide additional and/or different points at which vacuum or pressure is supplied to each suction head 50. In fact, in some applications it may not be necessary to provide blow off pressure through opening 79.

In pneumatic circuit 132, vacuum is supplied by a vacuum source 134, such as a vacuum pump. This vacuum is supplied to manifold 64 and elongate opening 78 by a vacuum line 136. Similarly, vacuum is supplied to elongate opening 79 by a vacuum line 138 which is connected to vacuum line 136. A selector valve 140 is connected into vacuum line 138 and permits vacuum at elongate opening 79 when disposed at a first valve position. It is preferred that a vacuum be maintained at each suction head 50 as it moves from first location 26 to second location 28 and only when the suction head 50 is in close proximity to second location 28 is the vacuum removed at elongate opening 79. Optionally, a vacuum gauge 137 can be connected to manifold 64 to provide a visual indication of the vacuum level.

Blow-off pressure for removing object 24 from suction head 50 at second location 28 is provided by a first pressure source 142, such as a compressor, which is connected to a pressure line 144. Pressure line 144 is preferably interrupted by an on/off valve 146 and a pressure regulator 148 so the pressure in line 144 can be adjusted for optimum performance. Pressure line 144 is also connected to selector valve 140. As valve 140 is moved to its second valve position, the vacuum in vacuum line 138 is removed and blow-off pressure is supplied through pressure line 144 and the portion of vacuum line 138 extending between selector valve 140 and elongate opening 79. Thus, as a suction head 50 moves to second location 28, selector valve 140 is moved to its second position allowing pressure to flow through elongate opening 79 and remove object 24 from the suction head 50.

Selector valve 140 is preferably a pneumatically actuated valve controlled by a control valve 150. Control valve 150 is connected to selector valve 140 by a first pressure line 152 and a second pressure line 154. Pressure is supplied to control valve 150 by a second pressure source 156 through a pressure supply line 158. When control valve 150 is in a first position, pressure from pressure source 156 flows through supply line 158 and second pressure line 154 to move selector valve 140 to its first valve position where a vacuum is supplied at elongate opening 79. When control valve 150 is moved to a second position, pressure travels through supply line 158 and first pressure line 152 to move selector valve 140 to its second valve position allowing pressure to flow from first pressure source 142 to elongate opening 79.

In the preferred embodiment, control valve 150 is a spring loaded valve actuated by a cam disk 160 having an extension or extensions 162 appropriately located on cam disk 160 to move control valve 150 to its second position when each suction head 50 is in proximity with second location 28. This, in turn, moves selector valve 140 to its second position allowing pressure from pressure source 142 to force air through elongate opening 79, hub 44, the corresponding pneumatic line 52, and the corresponding bellows 58 to blow plate 24 away from the suction head 50 at second location 28. Although cam disk 160 could be located at a variety of places on turret apparatus 14, it is preferably disposed adjacent drive sprocket 40.

As mentioned above, when turret apparatus 14 is used to handle battery electrode plates, there are often two turret systems which work together with one handling positive electrode plates and the other handling negative electrode plates. In this environment, the same vacuum source and pressure sources may be used to supply parallel pneumatic circuits.

Also illustrated in FIG. 8 is a schematic representation of the air knife assembly 60. Preferably, air knife assembly 60 is connected to pressure line 144 by a pressure line 164. A regulator 166 is used to maintain a substantially constant desired pressure at air knife assembly 60.

The vacuum levels, pressure levels, and air volume levels in pneumatic circuit 132, as well as the configuration and size of each suction head 50 and each bellows 58, is important for optimum transfer of individual plates 24. Of course, these parameters can be changed and adjusted according to the specific application of vacuum turret apparatus 14. However, when lead electrode plates for storage batteries are transferred from first location 26 to second location 28, certain ranges of pressure, vacuum, and air volume are preferred. For example, a relatively quick, smooth lifting of the uppermost lead plate 24 is desirable and has been found to require a vacuum in the range from about 9 to 16 inches Hg, and most preferably about 14 inches Hg. The volume of air drawn by the vacuum prior to attachment of plate 24 should be in the range from about 8 to 20 cfm (cubic feet per minute), and most preferably about 15 cfm. Similarly, the pressure established by pressure regulator 148 should be sufficient to cleanly displace the plate 24 from its suction head 50 at second location 28 without damaging the plate. This pressure is preferably in the range from about 0 to 8 psi (pounds per square inch), and most preferably about 3 psi. The pressure at air knife assembly 60 is preferably in the range from about 3 to 12 psi. However, these ranges can be changed, expanded, or contracted to optimize the specific application.

Figure 9:
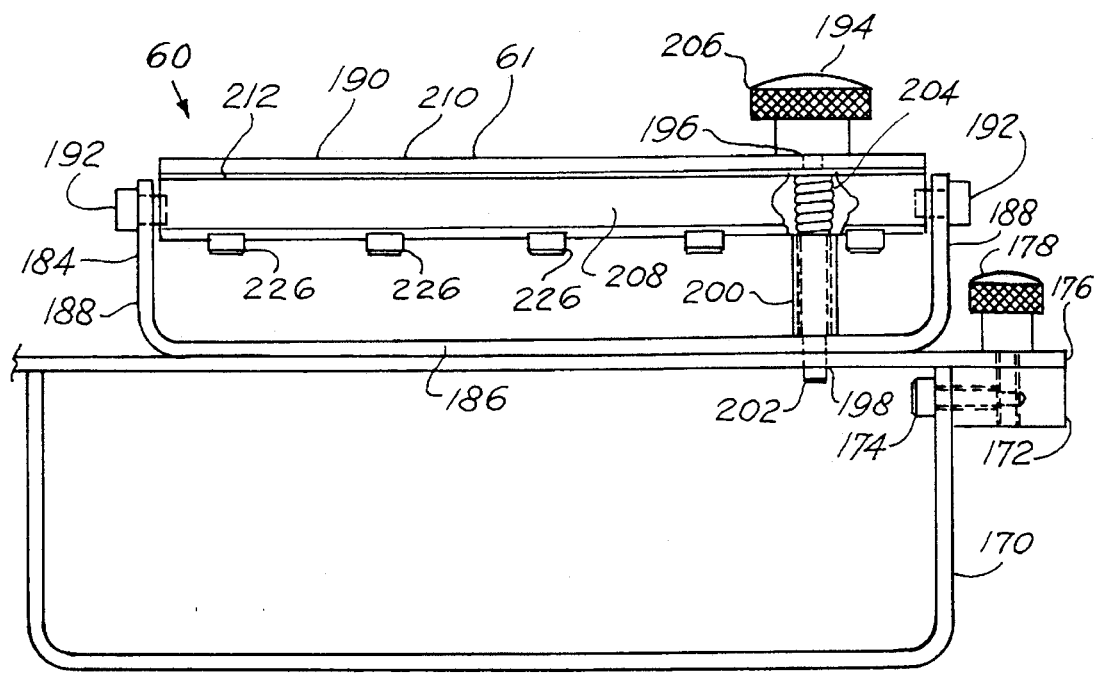
FIG. 9 is an end view of the air knife assembly.
Figure 10:
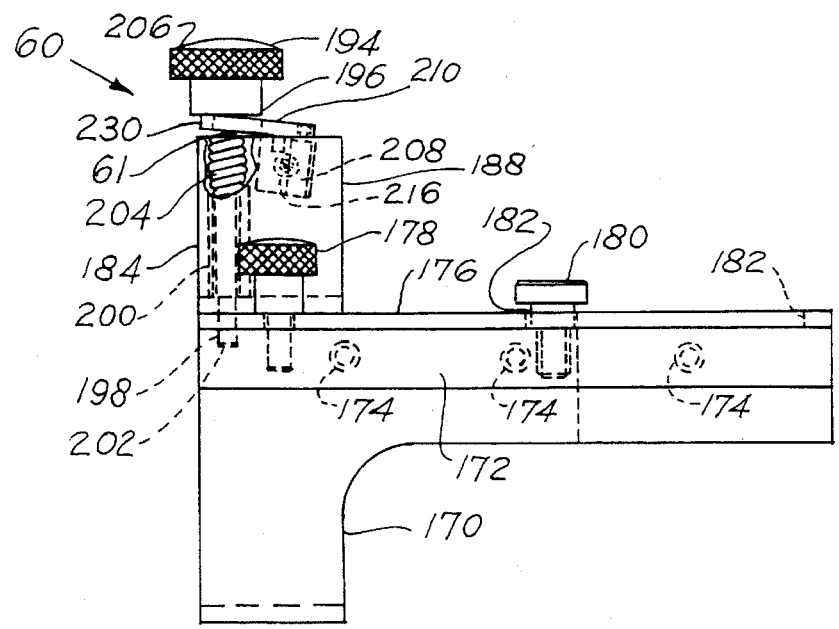
FIG. 10 is a front view of the air knife assembly.

Air knife assembly 60 is illustrated in greater detail in FIGS. 9 and 10. Air knife assembly 60 includes a base support 170 preferably mounted to framework 32 or indexing assembly 34. A side bar 172 is affixed to the side of base support 170 by a plurality of fasteners 174, such as screws. A slide plate 176 rests on top of base support 170 and side bar 172 and is held in place by a thumb screw 178 and a lock screw 180. Thumb screw 178 and lock screw 180 extend through a pair of slots 182 in slide plate 176 and are threadably received in side bar 172. Thus, slide plate 176 may be adjusted along base support 170 and side bar 172 by loosening thumb screw 178 and lock screw 180 and sliding slide plate 176 to the desired location. Once at the desired location, thumb screw 178 and lock screw 180 are tightened along slots 182 to hold slide plate 176 in place.

An air knife bracket 184 is attached to slide plate 176 on the side opposite base support 170. Bracket 184 is preferably U-shaped with a base 186 attached to slide plate 176 and a pair of legs 188 extending from base 186 away from slide plate 176. Base 186 may be attached to slide plate 176 in a variety of ways including welding, adhesive, or fasteners. An air knife 190 is pivotably mounted between legs 188 and held in place by a pair of shoulder screws 192 wherein one screw extends through each leg 188.

The angle of air knife 190 is controlled by a thumb screw 194 which extends through an opening 196 in air knife 190. Opening 196 is offset from the axis of rotation about shoulder screws 192 so that air knife 190 may be pivoted by tightening or loosening thumb screw 194. Preferably, thumb screw 194 is threadingly received in a threaded bore 198 disposed through base 186 and slide plate 176. A bushing 200 is disposed about a shank 202 of thumb screw 194 and is disposed in contact with base 186. A coil spring 204 is disposed between bushing 200 and air knife 190 to maintain air knife 190 securely against a thumbscrew head 206 of thumb screw 194.

Thus, air knife 190 can be adjusted towards or away from stack 16 by sliding slide plate 176 with respect to base support 170. Additionally, the angle of the air stream coming from air knife 190 can be adjusted by tightening or loosening thumb screw 194.

Figure 11:
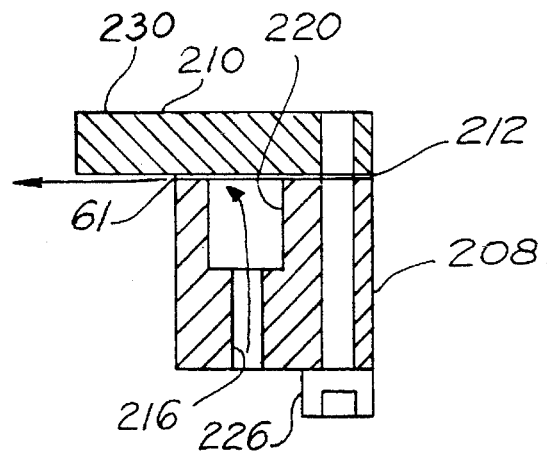
FIG. 11 is a cross-sectional view of the air knife.
Figure 12:
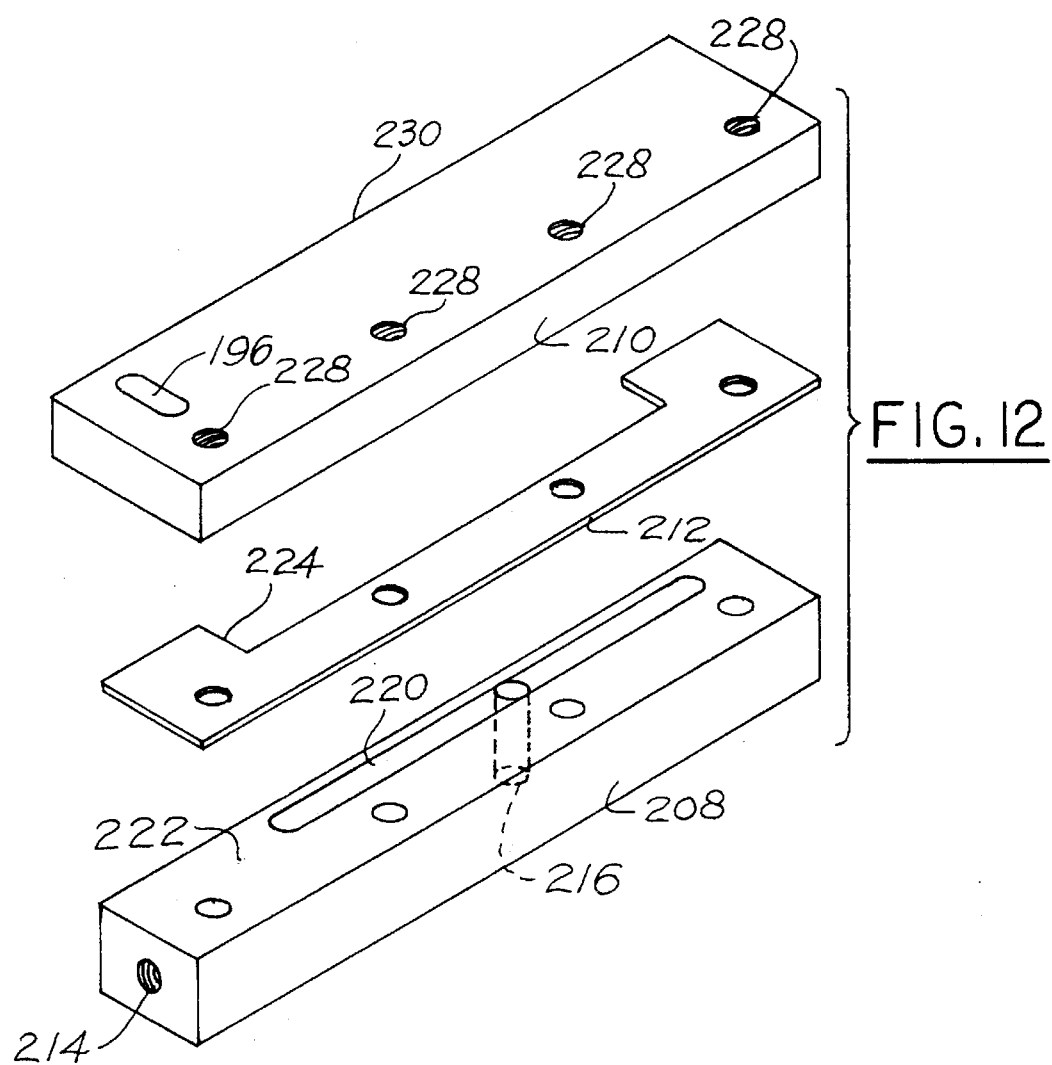
FIG. 12 is an exploded view of the air knife.

The most preferred embodiment of air knife 190 is illustrated in FIGS. 11 and 12. Air knife 190 includes an orifice plate 208 and a top plate 210 separated by a shim 212. Orifice plate 208 includes a hole 214 in each end for receiving shoulder screws 192 which allow air knife 90 to pivot. Orifice plate 208 also includes an inlet passage 216 extending through orifice plate 208 and into communication with a slot 220 formed in a surface 222 of orifice plate 208. Shim 212 rests against surface 222 and includes a cutout region 224 to facilitate airflow. Shim 212 also separates top plate 210 from orifice plate 208 when top plate 210 is affixed to orifice plate 208. Preferably, orifice plate 208, top plate 210, and shim 212 are held together by a plurality of fasteners 226, such as threaded screws (see FIG. 9) received in corresponding threaded apertures 228 in top plate 210. Additionally, top plate 210 preferably includes an overhang portion 230 which extends beyond orifice plate 208. Opening 196 extends through this overhang portion and is configured to receive shank 202 of thumb screw 194 therethrough.

In operation, pressure line 164 (shown in FIG. 8) is connected to inlet passage 216 by an appropriate fastener, such as a threaded nipple. Pressurized air flowing through pressure line 164 moves through inlet passage 216 and spreads out along slot 220 as it is forced through cut out portion 224 of shim 212 and narrow aperture 61 between plates 208 and 210. Cutout portion 224 must be large enough to avoid blocking slot 220 while allowing the pressurized air to flow out from between top plate 210 and orifice plate 208 in a high pressure sheet of air.

It will be understood that the foregoing description is of a preferred exemplary embodiment of this invention, and that the invention is not limited to the specific form shown. For example, different types of indexing assemblies may be used, the pneumatic circuit may be incorporated into parallel or multiple systems, some components can be replaced by hydraulic components, and the specific configuration of components, such as the air knife assembly or bellows, can be altered or adjusted according to the specific application. These and other modifications may be made in the design and arrangement of the elements without departing from the scope of the invention as expressed in the appended claim.

We claim:

1. An apparatus for lifting an individual object from a stack of objects and moving the object between a first location and a second location, the apparatus comprising:

a turret assembly rotatably mounted about a central turret axis, the turret assembly including a plurality of arms extending outwardly from the central turret axis, each arm having a suction head at a spaced distance from the central turret axis;

an indexer connected to the turret assembly to rotate the turret assembly in stepwise fashion, sequentially moving each suction head from the first location to the second location; and a pneumatic circuit configured for connection between a vacuum source and each suction head to selectively provide a vacuum to each suction head when in proximity to the first location and during a preselected portion of the rotation of the turret assembly, wherein the vacuum is sufficient to secure the individual object to the suction head at the first location and oriented to provide a lifting bias on the individual object generally parallel to the central turret axis, the suction head being configured to stablilize the object as it moves from the first location to the second location, wherein each suction head includes at least one flexible bellows, each flexible bellows being in a generally relaxed position until it engages the object, at which time the vacuum created in the flexible bellows causes the bellows to contract and lift the object.

2. The apparatus of claim 1, wherein each suction head includes a plurality of flexible bellows.

3. The apparatus of claim 1, wherein each suction head includes four flexible bellows arranged in a pattern to securely and evenly support the object when it is moved from the first location to the second location.

4. The apparatus of claim 2, wherein each bellows has an accordion style wall which folds under the influence of sufficient vacuum when in contact with the object.

5. The apparatus of claim 1, wherein the pneumatic circuit is further configured for connection to a pressure source, the pneumatic circuit including a selector valve which is actuated to selectively connect the pressure source to each suction head when that suction head is in proximity with the second location.

6. The apparatus of claim 5, further comprising an air knife which selectively directs a stream of air towards the first location to facilitate separation of an individual object from the remainder of the stack.

7. The apparatus of claim 6, wherein the air knife includes a narrow, elongated slot through which a stream of air is forced towards the individual object.

8. An apparatus for lifting an individual object from a stack of objects and moving the object between a first location and a second location, the apparatus comprising:

a turret assembly rotatably mounted about a central turret axis, the turret assembly including at least one arm, each arm having a suction head at a spaced distance from the central turret axis;

an indexer connected to the turret assembly to rotate the turret assembly in stepwise fashion, sequentially moving each suction head from the first location to the second location; and a pneumatic circuit configured for connection between a vacuum source and each suction head to selectively provide a vacuum to each suction head when in proximity to the first location and during a preselected portion of the rotation of the turret assembly, wherein the vacuum is sufficient to secure the individual object to the suction head at the first location and the suction head is configured to stabilize the object as it moves from the first location to the second location, wherein each suction head includes at least one flexible bellows, each flexible bellows being in a generally relaxed position until it engages the object, at which time the vacuum created in the flexible bellow causes the bellows to contract and lift the object, wherein each arm is pivotally mounted to a center hub to allow generally vertical pivotal movement of each suction head.

9. The apparatus of claim 8, further comprising a cam follower surface on each arm, wherein each cam follower surface moves along a cam track extending around the central turret axis, the cam track being configured to move each suction head into closer proximity with the object at the first location and to lift the suction head as it continues to rotate about the central turret axis.

10. An apparatus for lifting an individual object from a stack of objects and moving the object between a first location and a second location, the apparatus comprising:

a turret assembly rotatably mounted about a central turret axis, the turret assembly including at least one arm, each arm having a suction head at a spaced distance from the central turret axis;

an indexer connected to the turret assembly to rotate the turret assembly in stepwise fashion, sequentially moving each suction head from the first location to the second location; and a pneumatic circuit configured for connection between a vacuum source and each suction head to selectively provide a vacuum to each suction head when in proximity to the first location and during a preselected portion of the rotation of the turret assembly, wherein the vacuum is sufficient to secure the individual object to the suction head at the first location, and the suction head is configured to stabilize the object as it moves from the first location to the second location, wherein each arm is pivotably mounted to a center hub to allow generally vertical pivotal movement of each suction head, further comprising a cam follower surface on each arm, wherein each cam follower surface moves along a cam track extending around the central turret axis, the cam track being configured to move each suction head into closer proximity with the object at the first location and to lift the suction head as it continues to rotate about the central turret axis, further comprising a skip pate which cooperates with each suction head in proximity to the first location to lift the suction head away from the object and to selectively prevent attachment of the object to the suction head.

11. An apparatus for lifting an individual object from a stack of objects and moving the object between a first location and a second location, the apparatus comprising:

a turret assembly rotatably mounted about a central turret axis, the turret assembly including at least one arm, each arm having a suction head at a spaced distance form the central turret axis;

an indexer connected to the turret assembly to rotate the turret assembly in stepwise fashion, sequentially moving each suction head from the first location to the second location; and a pneumatic circuit configured for connection between a vacuum source and each suction head to selectively provide a vacuum to each suction head when in proximity to the first location and during a preselected portion of the rotation of the turret assembly, wherein the vacuum is sufficient to secure the individual object to the suction head at the first location, and the suction head is configured to stabilize the object as it moves from the first location to the second location, further comprising an air knife connected to the pneumatic circuit and disposed to project a high pressure stream of air towards the individual object to facilitate separation of the object from the stack.

12. An apparatus for transferring battery electrode plates disposed in a stack, the apparatus being configured to move individual battery electrode plates between a first location and a second location, the apparatus comprising:

a turret assembly rotatably mounted about a central turret axis, the turret assembly including a center hub and a plurality of arms extending radially outward from the hub, each arm including a suction head having at least one contractible bellows configured for engagement with an uppermost electrode plate of the stack and for lifting of the uppermost electrode plate from the stack;

an indexing assembly connected to the turret assembly to rotate the turret assembly and sequentially move each arm from the first location to the second location; and a pneumatic circuit configured for connection between a vacuum source and each contractible bellows to selectively provide a vacuum during a preselected portion of the rotation of each suction head from the first location to the second location, wherein the vacuum is sufficient to secure the individual plate to the suction head at the first location.

13. The apparatus of claim 12, wherein each arm is pivotally mounted to the hub, allowing the suction head and bellows to move in a generally vertical direction.

14. The apparatus of claim 13, further comprising a cam mounted about the central axis and a cam follower surface on each arm disposed to follow the cam during rotation of the turret assembly, the cam being configured so each arm will move downwardly towards the stack in proximity to the first location and then upwardly after rotating past the first location.

15. The apparatus of claim 14, wherein the cam includes a passage through which the pneumatic circuit is connected to each bellows, the passage cooperating with each arm to selectively connect a vacuum supply to the bellows in each suction head when that suction head is in proximity to the first location.

16. The apparatus of claim 12, wherein the bellows include a screen to filter air passing therethrough.

17. The apparatus of claim 16, wherein there are at least two bellows in each suction head.

18. The apparatus of claim 17, wherein each bellows is made from an elastomeric material.

19. The apparatus of claim 17, wherein there are at least four spaced apart bellows cooperating with each suction head arranged to evenly support the individual plate when it is lifted by the suction head.

20. The apparatus of claim 12, further comprising an air knife which directs a stream of air towards the individual plate to facilitate separation of the plate from the stack.

21. The apparatus of claim 12, wherein the pneumatic circuit is further connected to a pressure source, the pneumatic circuit including a selector valve which is selectively actuated when each suction head is in proximity with the second location to provide air pressure for removal of the plate from the suction head.

\* \* \* \* \*